May 5, 1953     J. K. SHANNON     2,637,758
STORAGE BATTERY

Filed Sept. 23, 1948     2 SHEETS—SHEET 1

INVENTOR
JOHN K. SHANNON.
BY
ATTORNEYS

May 5, 1953  J. K. SHANNON  2,637,758
STORAGE BATTERY

Filed Sept. 23, 1948  2 SHEETS—SHEET 2

INVENTOR
JOHN K. SHANNON
BY
ATTORNEYS

Patented May 5, 1953

2,637,758

UNITED STATES PATENT OFFICE 2,637,758

STORAGE BATTERY

John K. Shannon, Kenosha, Wis.

Application September 23, 1948, Serial No. 50,713

5 Claims. (Cl. 136—166)

This invention appertains to electric batteries, and more particularly to a simplified and inexpensive method of assembling storage batteries.

One of the primary objects of my invention is to provide a novel method of constructing the battery, whereby not only will an inexpensive structure be had, but whereby a strong and durable battery can be built for resisting external strains and jars and so that shorts between cells will be eliminated, or reduced to a minimum.

Another salient object of my invention is to provide an improved individual cover for each cell of the battery, having molded directly therein adjacent to each end and at the time of the forming thereof a lead insert or strap adapted to be engaged by the lugs of the battery plates, so that as the lugs are burned or melted down, the plates will be integrally connected with the straps and firmly joined to the cell covers.

A further object of my invention is to provide a terminal on the straps, where an external post is to be provided, molded directly in the cell covers, so that the terminals can serve as posts or whereby posts can be molded thereon, so that in effect, the plates, straps and terminals will be an integral structure strongly united with the cell covers.

A further important object of my invention is to provide means whereby the connectors or jumpers for the cells can be directly molded by burning or melting with the correct molded-in straps.

A still further object of my invention is to provide wells or dams at the points of the molding-in of the straps, so that upon the melting down of the lugs of the battery plates, the lead will be confined to a desired, restricted area.

A still further object of my invention is to construct the cell covers and the molded-in straps in such a way that the lugs of the plates can be readily slipped through the covers and in contact with, or in close proximity to the molded-in straps.

A still further important object of my invention is to provide a housing cover plate for the battery case and cell covers, whereby a sealing compound can be poured in and over the cell covers and battery case partitions through said cover plate, the sealing compound functioning to hold the cover plate in position.

With these and other objects in view the invention consists in the novel construction, arrangement and formation of parts, as will be hereinafter more specifically described and claimed and illustrated in the accompanying drawings, in which drawings:

Figure 1:
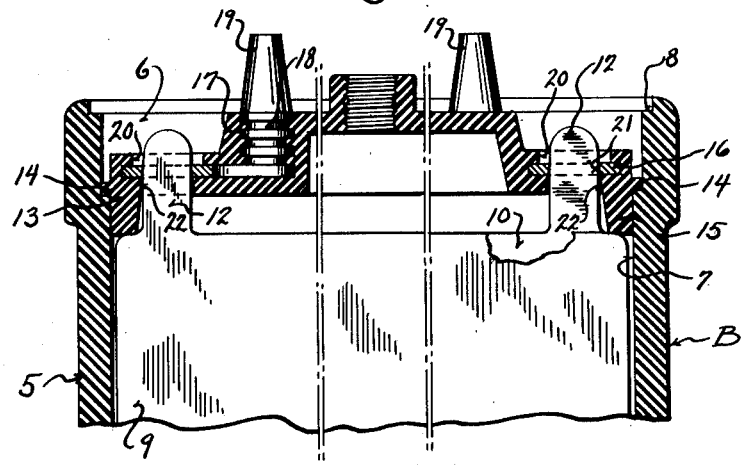
Figure 1 is a fragmentary, transverse, sectional view showing one preferred form of my improved storage battery prior to the burning down of the battery plate lugs.

Referring to the drawings in detail, wherein similar reference characters designate corresponding parts throughout the several views, the letter B generally indicates my improved storage battery. The storage battery B includes a molded case 5 formed from non-electric conducting and acid resisting material. Integrally connected with the case are spaced parallel transverse partitions 6, which divide the case into individual cell compartments or chambers 7. The partitions terminate slightly short of the extreme upper edge of the case. The upper edge of the case on its inner edge is rabbeted to form a shoulder 8, for a purpose which will later appear. The battery may include as many cell compartments or chambers as desired and in the present instance a three cell battery case has been shown.

Each cell compartment or chamber 7 receives the desired number of positive and negative plates 9 and 10, spaced by the usual separators 11. The lower edges of these plates can be supported on webs (not shown) formed on the bottom wall of the case 5.

In accordance with my invention the ends of the battery plates 9 and the opposite ends of the battery plates 10 have formed thereon upwardly projecting lugs 12. The plates of like polarity are connected together in a novel manner, as will be later set forth.

A cell cover 13 is provided for each individual cell compartment or chamber 7 and these cell covers are molded from the desired plastic material of the character which will be acid proof. Naturally, also the same will be of non-electric conducting material. Each cell compartment below the shoulders 8 are provided with shoulders 14 on which the covers 12 rest. The covers also have formed on their ends depending flanges 15, which extend toward the sets of plates 9 and 10, so as to prevent the upward riding of the separators 11 between the plates. In accordance with my invention, I mold directly in the covers adjacent to their opposite ends lead or similar straps 16. By molding the straps directly in the covers, the straps are held firmly in place and in effect form a part of the covers. Formed on the straps as an integral part thereof, are upstanding projections 17 and these projections 17 are also molded in the covers and these projections can be provided with annular grooves 18 so that the material from which the covers are formed can flow therein. This will effectively anchor the projections in place. The projections 17 are formed on one side of those straps that are below the terminal ends of the batteries and the projections can have formed directly thereon at the time of the making thereof, terminal posts 19, or the projections can have molded thereon by suitable post builders the terminal posts. The upper faces of the straps 16 are exposed and the covers 13 around the straps are provided with sunken recesses or wells 20, which form dams for a purpose which will later appear.

The straps 16 can take various shapes and forms, but it is essential that the same be so molded that the straps will form a substantially integral part of the lugs 12, when the same are burned or melted down, as will also later appear. It is not essential that there be strap 16, molded into the covers on the cover ends which do not have external terminals. The lugs of the plates may be melted down or burned to form the lead shoulder or strap and this strap may be built up to the proper thickness by conventional means well known in the battery industry for strength and to carry the electrical current. In the covers carrying the terminals 19, the terminals can be provided with portions extending into the wells 20. The lugs 12 and the extended portion of the terminals can be burned down to fill the well. The wells 20 will restrict the flow of lead so that the lead will not flow over the cover 13, but will be dammed to form the shoulder or strap.

Figure 2:
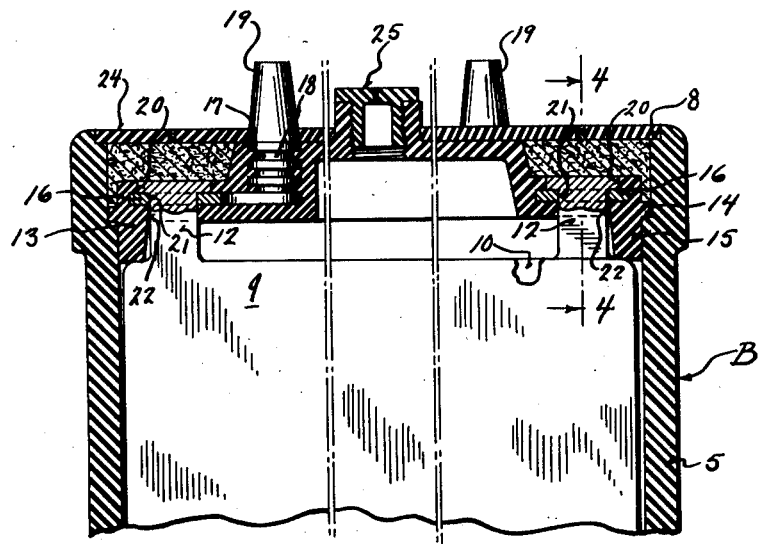
Figure 2 is a view similar to Figure 1, but showing the battery in its complete form ready for use.
Figure 3:
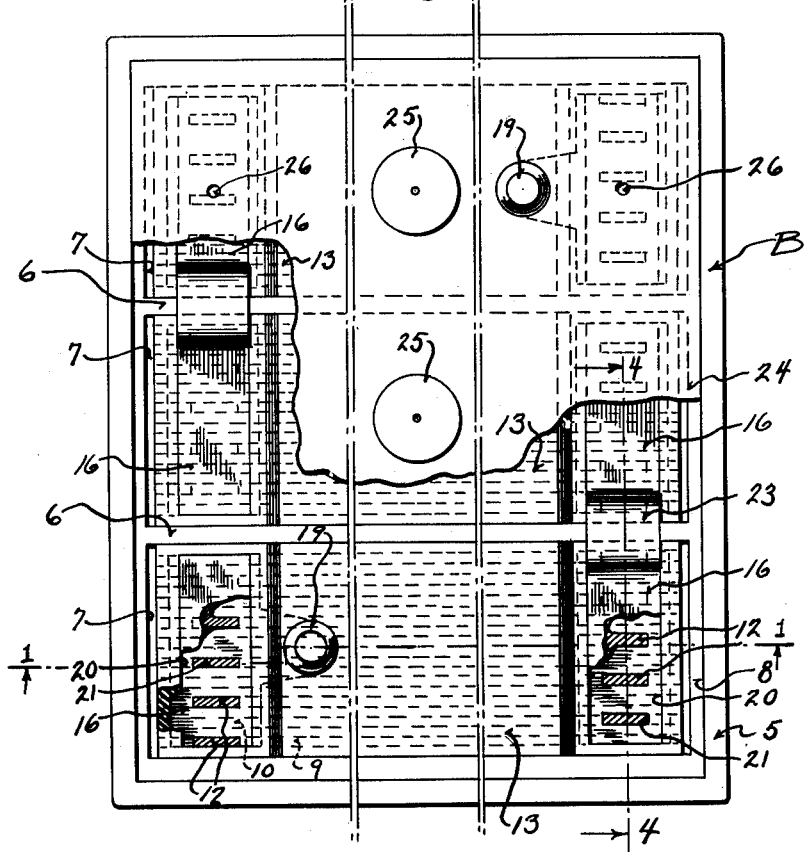
Figure 3 is a top plan view of my improved battery with parts thereof broken away and in section.
Figure 4:
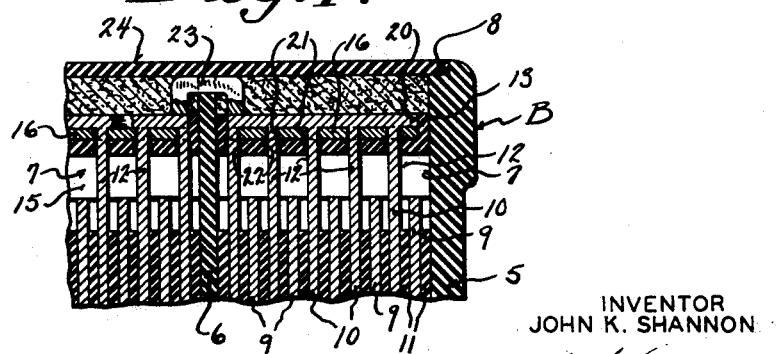
Figure 4 is a fragmentary, longitudinal, sectional view through the battery, taken on the line 4—4 of Figure 1, looking in the direction of the arrows.

One form of the straps 16 has been illustrated in the drawings and this form has been found the best, so far devised. As illustrated, the straps are provided with equidistantly spaced parallel slots 21, and these slots register with similar slots 22 formed in the covers. These slots 21 and 22 preferably widen out toward their lower ends, so as to facilitate the slipping of the covers over the lugs 12, and the lugs themselves have rounded upper terminals to facilitate their movement through the slots. Obviously, the straps 16 could be provided with fingers to engage between the lugs 12 in lieu of the slots, or the same could be made in other manner that might readily suggest themselves to the skilled mechanic. After the plates and separators have been placed in the correct manner in their respective cells, the cell covers are placed over the individual cells with the lugs 12 projecting through the slots 21 and 22. This is best shown in Figure 1 of the drawings. The lugs 12 are now burned or melted down over the straps, see Figures 2, 3 and 4, and the lugs after melting form a definite part of the straps. The terminal posts 19 project up through the covers and above the battery case 5. Plates of like polarity of the necessary cells are connected by jumpers 23. These jumpers extend over the partitions 6 of the battery case. The jumpers can be burned on to the straps 16 or, as preferred, the necessary straps have molded directly thereon laterally projecting ears which are burned together.

After the desired connections have been made a protecting cover plate 24 is placed over the case and fitted snugly on the shoulder 8. This cover plate 24 is provided with the necessary openings for receiving the terminal posts 19 and the filling and vent caps 25. The cover plate 24 over each cell is provided with filling openings 26 and a sealing compound in a fluid condition is forced into the battery case through these openings 26 until the entire space between the individual cell covers 13 and the cover plate 24 is filled. This sealing compound effectively covers the straps, the cell covers 13, jumpers 23 and partitions 6. The sealing compound also acts to hold the cover plate 24 in position. It is obvious that sealing compound may be poured around the edges of the cover, over the straps in the same manner as is the common practice currently used in the assembly of batteries by battery manufacturers, without the addition of the protecting cover plate 24.

The wells 20 effectively act as a dam to receive the lead upon the melting down of the battery plate lugs 12 and the jumpers 23 and these wells prevent the flowing of the lead over the cell covers 13.

From the foregoing description, it can be seen that I have provided a novel battery of a simple and rugged form, in which the battery plates are effectively united with their straps, which in turn form an integral part of the cell covers.

Various changes in details may be made without departing from the spirit or the scope of this invention but what I claim as new is, 1. In a storage battery, a case having a cell compartment, battery plates in said compartment having upstanding lugs, a cover for said compartment, said cover comprising a body having a peripheral skirt and an interiorly hollow member providing a gas collection space rising above the level of said body centrally thereof, said hollow member having a filler opening formed therein, end portions of said cover having laterally extending recesses located adjacent the end edges of said cover, said recesses comprising wells having spaced slots extending downwardly through said cover to accept said lugs when the cover is placed in position, and a terminal member molded into said cover in said hollow member, said terminal member comprising an upstanding terminal post extending above said hollow member and a laterally extending connector member, a portion of said connector member lying in proximity to the slots in a said well, said lugs being burned down within said well into intimate connection with one another and with the said portion of said connector member.

2. The structure of claim 1 in which said slots terminate downwardly in flaring enlargements serving to guide said plate lugs therethrough.

3. The structure of claim 1 wherein a connector strap is molded into said cell cover within the region of a said well, said connector strap having openings responding to and in communication with said slots, said connector strap being joined with the connector member of said terminal post, said lugs being burned down within said well into intimate engagement with said strap.

4. The structure claimed in claim 1 wherein said slots terminate downwardly in flaring engagements serving to guide said plate lugs therethrough, said body at its ends having shoulders adapted to rest upon abutments in said storage battery case.

5. The structure claimed in claim 1 wherein that portion of the connector member which lies in proximity to the slots comprises a transverse connector bar.

JOHN K. SHANNON.

References Cited in the file of this patent

UNITED STATES PATENTS

| Number | Name | Date |
|---|---|---|
| 1,123,756 | Kinney | Jan. 15, 1915 |
| 1,178,066 | Gardiner | Apr. 4, 1916 |
| 1,183,810 | Gardiner | May 16, 1916 |
| 1,324,426 | Loudon | Dec. 9, 1919 |
| 1,380,061 | Hazelett | May 31, 1921 |
| 1,907,420 | Finn | May 2, 1933 |
| 2,100,333 | Hess | Nov. 30, 1937 |
| 2,186,148 | Raney | Jan. 9, 1940 |
| 2,189,327 | Rieser | Feb. 6, 1940 |
| 2,222,412 | King | Nov. 19, 1940 |
| 2,303,622 | Duncan | Dec. 1, 1942 |
| 2,326,537 | Hill | Aug. 10, 1943 |

FOREIGN PATENTS

| Number | Country | Date |
|---|---|---|
| 419,460 | Great Britain | Nov. 13, 1934 |
| 434,470 | Great Britain | June 9, 1934 |
| 462,004 | Great Britain | Mar. 1, 1937 |
| 510,238 | Great Britain | July 27, 1939 |